Figure 1:
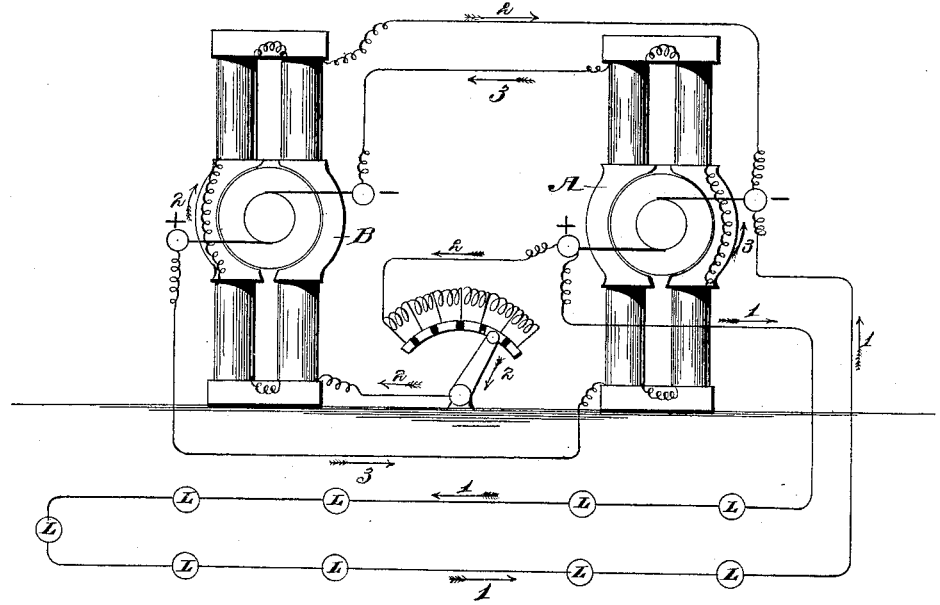

(No Model.)
2 Sheets—Sheet 1.

R. R. MOFFATT.
REGULATOR FOR DYNAMO OR MAGNETO ELECTRIC MACHINES.

No. 323,059. Patented July 28, 1885.

Witnesses:
Chas. S. Hyer
Willis Drummond

Inventor:
Richard R. Moffatt
By [signature]
Atty.

(No Model.) 2 Sheets—Sheet 2.
R. R. MOFFATT.
REGULATOR FOR DYNAMO OR MAGNETO ELECTRIC MACHINES.
No. 323,059. Patented July 28, 1885.
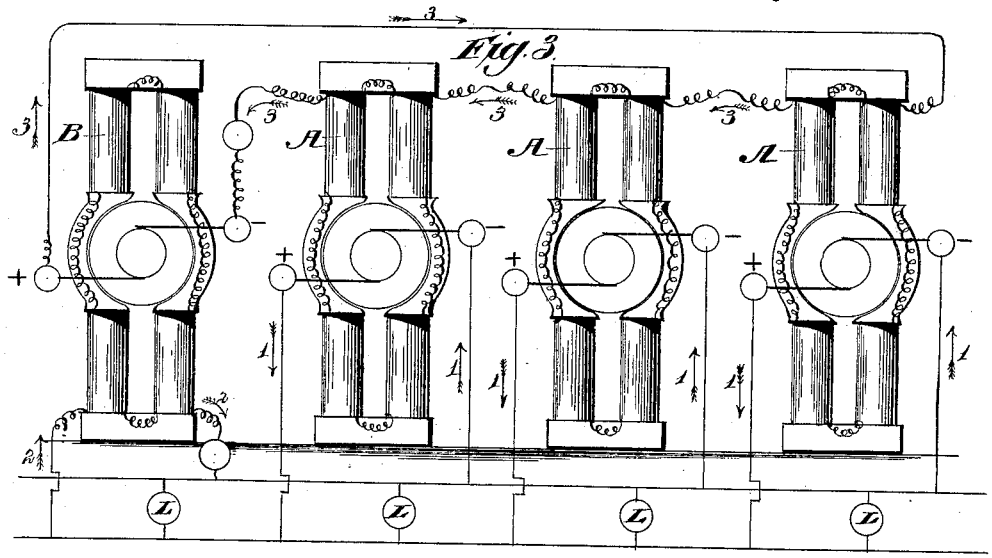
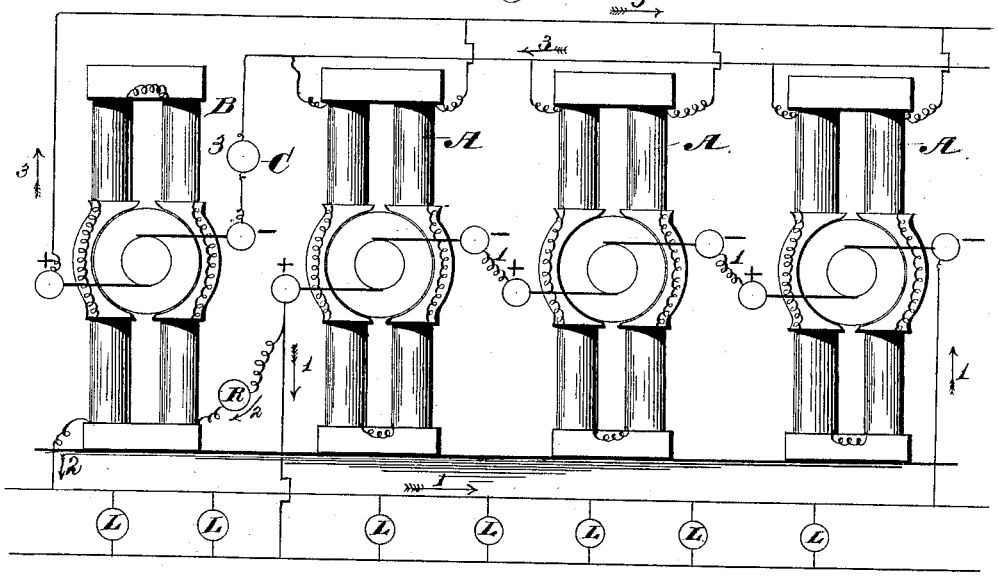
Witnesses:
Charles S. Hyer.
Willis Drummond
Inventor:
Richard R. Moffatt.
By Dumarle
Atty.

UNITED STATES PATENT OFFICE.

RICHARD R. MOFFATT, OF BROOKLYN, NEW YORK, ASSIGNOR TO THE BROOKLYN ELECTRIC CONSTRUCTION COMPANY, OF SAME PLACE.

REGULATOR FOR DYNAMO OR MAGNETO ELECTRIC MACHINES.

SPECIFICATION forming part of Letters Patent No. 323,059, dated July 28, 1885.

Application filed January 18, 1882. Renewed May 6, 1884. (No model.)

*To all whom it may concern:*

Be it known that I, RICHARD R. MOFFATT, of the city of Brooklyn, county of Kings, State of New York, have invented certain new and valuable Improvements in Magneto or Dynamo Electric Machines; and I do hereby declare the following to be a full, clear, and exact description of the invention, such as will enable others skilled in the art to which it pertains to make and use it, reference being had to the accompanying drawings, which form part of this specification.

This invention relates to dynamo or magneto electric machines, and has for its object their adaptation for producing electricity in volume of current proportioned to the work it has to perform in the external or main circuit—*i. e.*, to cause a constant current at all times in the working circuit whether the resistance in said circuit is increased or diminished, as in introducing lamps into the circuit or withdrawing them therefrom. I effect this by a novel means, whereby the field or force magnets of one or more dynamo-electric machines are automatically and controllably energized without varying the speed or rotation of the armatures.

The nature of this invention consists in the use of an auxiliary machine to excite the field of the main dynamo or dynamos, and the field of the auxiliary machine I excite entirely or in part by means of a derived circuit from the main or working circuit of the dynamo or dynamos. In this derived circuit is inserted an adjustable or variable resistance, so as to regulate (by hand or otherwise) the intensity of the field of the auxiliary machine, which in turn controls the generating force in the main dynamo or dynamos. If desired, a resistance may be inserted in the circuit that excites the field of the main generator or generators, so that the strength of the current flowing therein may be controlled independently of that in the derived circuit with the same ultimate result. The armatures of all the machines are driven at a normal speed by any suitable motive power. When the current from the auxiliary machine is used for energizing the field of two or more dynamos, I prefer its circuit (for such work) should be by multiple arc, as will be readily understood by those skilled in the art.

Figure 2:
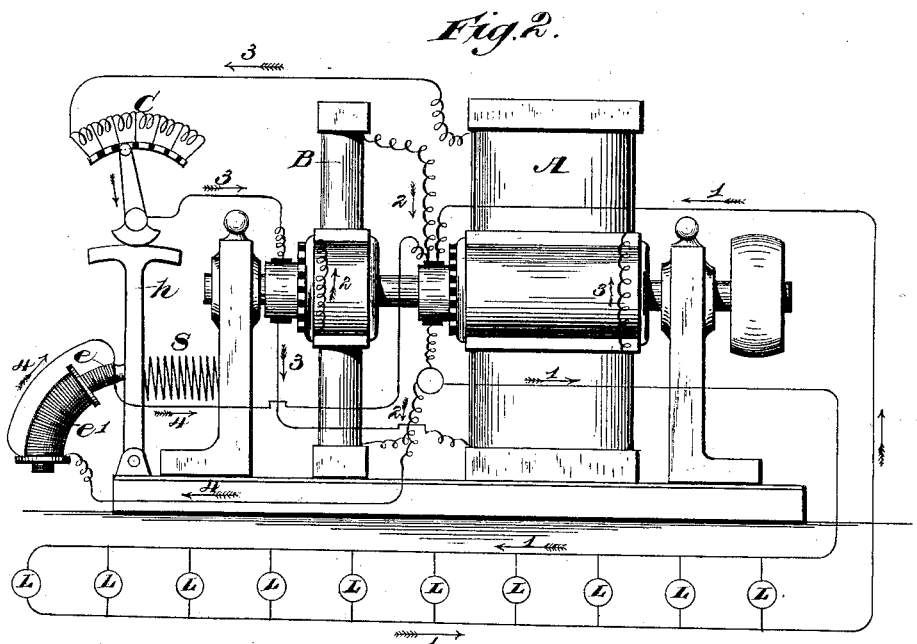

In the accompanying drawings, Figure 1 illustrates my invention, showing the main generating-machine and auxiliary machine separate. Fig. 2 represents a duplex machine embodying my invention. Figs. 3 and 4 are views illustrating my invention applied to several generators arranged in battery.

Similar letters of reference in the several figures of the drawings indicate like parts.

In Fig. 1, A represents the dynamo-electric machine from which the main or serviceable current is taken. The arrows marked 1 indicate its working circuit. B is a similar dynamo, which I call an "auxiliary" machine. The armatures of these machines are driven at a constant speed by any suitable motor. The current generated in the armature of the machine B is used for energizing or exciting the field-of-force magnets of the generator A, as indicated by the arrows marked 3.

A derived circuit from the main circuit, as shown by the arrows marked 2, is used to energize or excite the field of the auxiliary machine B. In this derived circuit is a varying or adjustable resistance, R, by which means the strength of the current that excites the field of the machine B is controlled, and thereby the generating capacity of the machines B and A.

In Fig. 2 the generators A and B are arranged as shown, the field-of-force magnets of each machine being separate or mutually independent of each other, while their (separate) armatures are mounted upon a single shaft or journal, so that they will both rotate together, and are driven from one pulley or driving-wheel. The armatures and field-of-force magnets and the circuits of these machines are connected up, as in the machine shown in Fig. 1; but an adjustable or variable resistance, C, is included in the circuit that energizes the field of the generator A. The current from the armature of the auxiliary machine B can also be used to excite in part the field of the machine B, and it may also energize the field-of-force magnets of several generators in battery, either by direct or multiple circuit, as shown in Figs. 3 and 4. The variable resistance C may be arranged so as to be operated by hand; or it may be automatically operated by means of an electro magnet or magnets (or solenoids) located in a derived circuit or any of the several circuits, as will be understood in the art. A simple device for this purpose I have shown in Fig. 2, in which $h$ represents a lever, to which is attached a magnet, $e$, arranged to move or play within the opening of a stationary helix, $e'$. The magnet and helix may be straight, if desired, or curved, as shown. Both magnet and helix are located in a circuit marked 4, which is derived from the main circuit of the dynamo or dynamos A. When no translating devices L are in the circuit marked 1, the current through the derived circuit marked 4 is sufficiently great to cause the maximum magnetization of the magnets $e$ and $e'$, thus putting all the resistance of C into the circuit marked 3, thereby controlling the field, and thus the generating capacity of the dynamo or dynamos A. The spring $s$ counteracts the force of the magnets $e$ and $e'$, as will be readily understood.

In the operation of my invention, the machines A and B having been charged, so as to possess residual magnetism to start a (weak) current, the power being applied to rotate the armatures of the two machines, a feeble current is generated in both machines, which excites the field of machine B, causing the generator A to become active, the currents circulating and reacting upon the generators (as is well known) until the maximum magnetization and generating capacity is attained. The variable resistance R is so adjusted that the current flowing through it will be just sufficient to excite the field of the magnet B, as shown in Fig. 1, for the production of a current therefrom of the proper strength for energizing the field of the machine A, so that the latter will generate a current equal to the work for which it is intended. When more resistance—such as lamps, &c., arranged in series—is brought into the main circuit it causes an increased flow of current through the derived circuit, thus increasing the magnetic power in the poles of the machine B, causing it to generate a stronger current, which increases the strength of the field in the machine A, causing it to generate a stronger current, thus re-establishing the desired strength of current in the working circuit. When the lamps, &c., are cut out and the resistance in the main circuit is reduced, then the amount of current passing in the derived circuit is also reduced, and the generating capacity of the machines B and A are lessened until only the required amount or quantity of current is produced for the work to be done.

This system of regulation is applicable to work in circuits in which the translating devices—such as lamps, &c.—are arranged in series or in multiple arc, or in multiple-arc series.

Having thus fully described the nature, construction, and operation of my invention, what I claim as new, and desire to secure by Letters Patent, is—

1. The combination of a dynamo-electric machine, A, with a similar auxiliary machine, B, the circuit from which energizes the field of the machine A, the field of the machine B being energized entirely or in part by the machine A through means of a derived circuit to its main or working circuit, substantially as set forth.

2. The combination, with a battery of dynamo-electric machines, of an auxiliary machine for supplying the field-current thereto, said auxiliary machine having its field energized entirely or in part by means of a derived circuit to the main circuit of the battery of the machines, substantially as set forth.

3. The combination of one or more generators, A, with the auxiliary generator B, the former having its fields energized by the latter and the latter having its field energized entirely or in part by the dynamo or dynamos A, through a circuit derived from the main circuit, and a variable resistance, R, located in said derived circuit for controlling the current that energizes the field of dynamo B, substantially as and for the purpose specified.

4. The combination of one or more generators A, with an auxiliary generator, B, the dynamo or dynamos A, having their fields energized by the dynamo B, the latter having its field energized by the generator or generators A, through a circuit derived from the main circuit, and a variable resistance, C, located in the circuit that energizes the fields of the generator or generators A, for controlling their generating capacity, substantially as and for the purpose herein specified.

5. The combination of one or more dynamos, A, with an auxiliary dynamo, B, the field of the latter being energized by the former through a derived circuit, and the field of the dynamos or dynamo A being energized by the dynamo B, and an automatically-adjustable resistance, C, located in the circuit that energizes the machine or machines A, said resistance being operated by means of magnets $e$ and $e'$, located in and forming part of a circuit that is derived from the main circuit of the machine or machines A, substantially as and for the purpose herein specified.

RICHARD R. MOFFATT.

Witnesses:
ARTHUR C. SALMON,
S. CHICHESTER.